United States Patent [19]
Tatsuda

[11] Patent Number: 6,064,543
[45] Date of Patent: May 16, 2000

[54] MAGNETIC TAPE LIBRARY APPARATUS INCLUDING MAGNETIC CARTRIDGE ROTATABLE TABLE

[75] Inventor: Ichiro Tatsuda, Kawasaki, Japan

[73] Assignee: Fujitsu Limited, Kawasaki, Japan

[21] Appl. No.: 08/275,964

[22] Filed: Jul. 15, 1994

[30] Foreign Application Priority Data

Sep. 30, 1993 [JP] Japan ................................. 5-244327

[51] Int. Cl.$^7$ ................................................ G11B 23/00
[52] U.S. Cl. ............................................................ 360/92
[58] Field of Search ........................... 360/92, 95, 98.04, 360/98.05; 369/34, 36, 37

[56] References Cited

U.S. PATENT DOCUMENTS

| | | | |
|---|---|---|---|
| 4,452,406 | 6/1984 | Richard | 360/95 |
| 4,717,090 | 1/1988 | Smith et al. | 360/95 |
| 4,864,438 | 9/1989 | Munro | 360/98.05 |
| 4,907,889 | 3/1990 | Simone | 360/92 |
| 5,132,949 | 7/1992 | Choi | 369/37 |
| 5,155,639 | 10/1992 | Platter et al. | 360/95 |
| 5,303,214 | 4/1994 | Kulakowski et al. | 360/98.04 |

*Primary Examiner*—David D. Davis
*Attorney, Agent, or Firm*—Greer, Burns & Crain

[57] ABSTRACT

A magnetic tape library apparatus having a bar code reader. The apparatus comprises a cell unit for housing magnetic tape cartridges, a drive unit for performing write and read operations on each magnetic tape cartridge, a cartridge access station for loading and unloading magnetic tape cartridges, an accessor for transferring each magnetic tape cartridge along a predetermined path, and a bar code reader station located along the path of the accessor. The bar code reader station includes a rotatable table on which to place a magnetic tape cartridge, and the bar code reader capable of reading a bar code from the magnetic tape cartridge placed on that table.

9 Claims, 10 Drawing Sheets

MAGNETIC TAPE LIBRARY APPARATUS INCLUDING MAGNETIC CARTRIDGE ROTATABLE TABLE

BACKGROUND OF THE INVENTION

1. Field of the Invention

The present invention relates to a magnetic tape library apparatus using magnetic tape cartridges as storage media. More particularly, the invention relates to a magnetic tape library apparatus having a bar code reader station for managing the magnetic tape cartridges loaded into the apparatus.

2. Description of the Related Art

Along with growing amounts of information to be processed by computer systems in recent years have come fully automated magnetic tape library apparatuses capable of accommodating and managing large quantities of magnetic tape cartridges without operator intervention. With many magnetic tape cartridges in storage in the library apparatus, the need is recognized for the ability to select any one of the stored cartridges using a bar code scheme.

There exist commercially available magnetic tape cartridges each comprising a substantially rectangular cartridge case, a magnetic tape wound inside the cartridge case, and a leader block attached to one end of the magnetic tape. The leader block is arranged to be engaged with one of the four corners of the cartridge case when the entire magnetic tape is wound therein.

Conventional magnetic tape library apparatuses illustratively have a bar code reader installed at their inlet port for admitting magnetic tape cartridges. When a magnetic tape cartridge is loaded into the magnetic tape library apparatus through the inlet port, the bar code reader reads the bar code attached to the magnetic tape cartridge before the cartridge is placed inside the apparatus.

One disadvantage of the above bar code scheme is that different magnetic tape cartridge suppliers attach the bar code label to a different location on each magnetic tape cartridge. This makes it difficult for conventional library apparatuses to read bar codes unfailingly from the cartridges that are used therewith.

SUMMARY OF THE INVENTION

It is therefore an object of the present invention to provide a magnetic tape library apparatus capable of reading bar codes easily from the magnetic tape cartridges to be loaded regardless of where the bar code is attached to each cartridge.

In carrying out the invention and according to one aspect thereof, there is provided a magnetic tape library apparatus for use with substantially rectangular magnetic tape cartridges each with a magnetic tape wound and housed therein, the magnetic tape having a leader block attached to one end thereof and engaged with one of the four corners of each cartridge case. The inventive magnetic tape library apparatus comprises: a cell unit having a plurality of cells for accommodating the magnetic tape cartridges; a drive unit for performing write and read operations on any one of the magnetic tape cartridges; a cartridge access station for loading and unloading the magnetic tape cartridges; an accessor moved along a predetermined movement path for transferring the magnetic tape cartridges between the cell unit, the drive unit and the cartridge access station; and a bar code reader station located along the movement path of the accessor and including a rotatable table and a bar code reader. The rotatable table serves as a carrier on which to place any one of the magnetic tape cartridges. The bar code reader reads the bar code from the magnetic tape cartridge placed on the rotatable table.

According to the invention, the bar code reader station is located along the movement path of the accessor, and the bar code reader station includes the rotatable table that carries the magnetic tape cartridge. This arrangement allows the bar code reader to read the bar code easily from the magnetic tape cartridge on the table regardless of where the bar code label is located over the cartridge.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
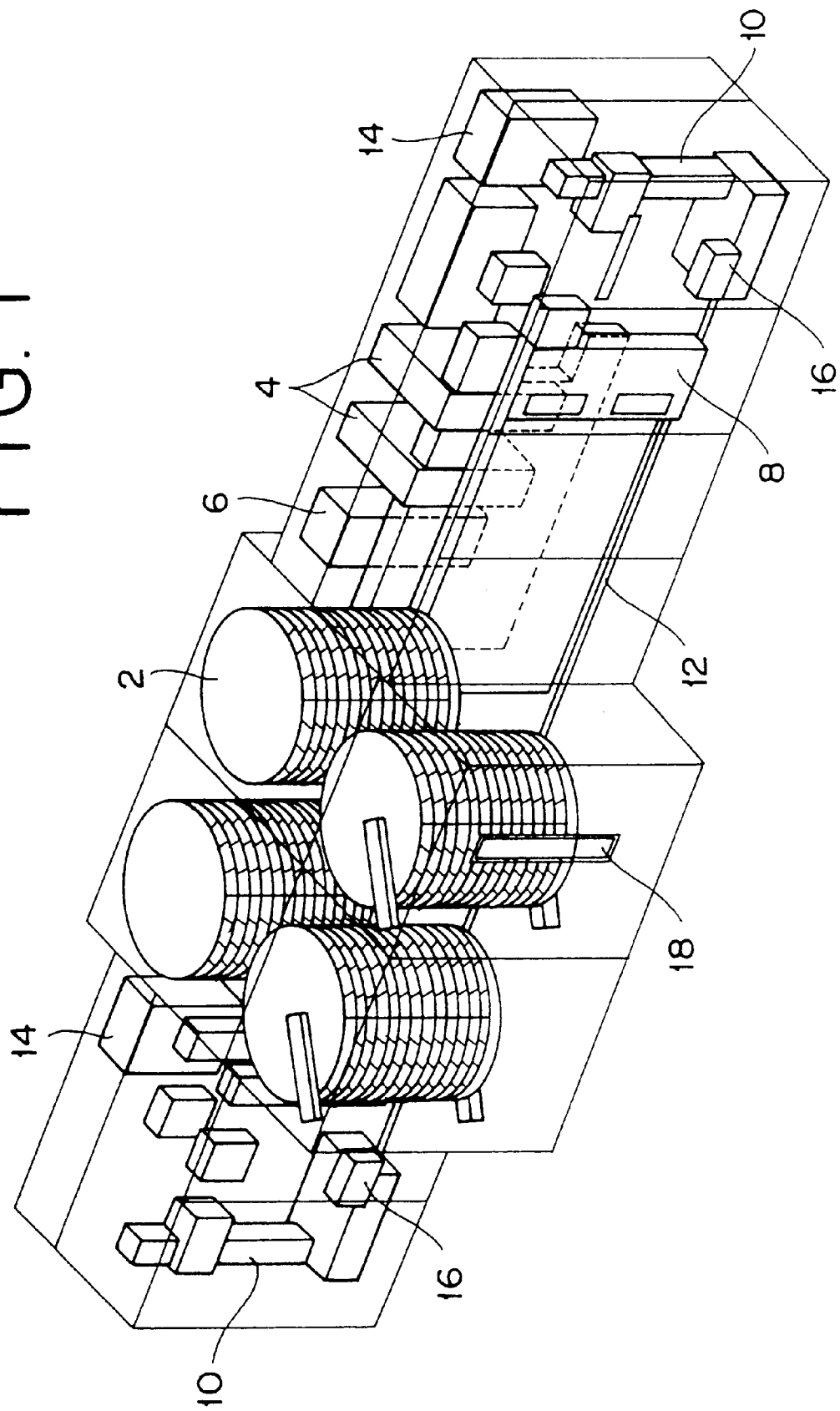
FIG. 1 is a perspective view of a magnetic tape library apparatus embodying the invention.

One preferred embodiment of the invention will now be described in detail with reference to the accompanying drawings. FIG. 1 is a perspective view of the magnetic tape library apparatus embodying the invention. The embodiment has four drum-like cell units 2 that accommodate many magnetic tape cartridges. Each cell unit 2 has a plurality of cells furnished in the circumferential and axial directions. One cell contains one magnetic tape cartridge. Near the cell units 2 is a drive unit 4 that performs write and read operations on each magnetic tape cartridge. A drive unit controller 6 is attached to the drive unit 4 for its control.

A cartridge access station 8 is provided whereby magnetic tape cartridges are loaded and unloaded to and from the magnetic tape library apparatus. An accessor 10 transfers magnetic tape cartridges between the cell units 2, the drive unit 4 and the cartridge access station 8. The accessor 10 moves along a movement path 12 made of rails or the like. While moving in this manner, the accessor 10 delivers and receives magnetic tape cartridges to and from the cell units 2, the drive unit 4 and the cartridge access station 8 for cartridge transfer therebetween. This embodiment actually has two accessors 10 to carry out two transfer jobs at the same time.

A bar code reader station 16 specific to this invention is located along the movement path 12 of the accessor 10. In this embodiment, two bar code reader stations 16 are provided to be paired with the two accessors 10. In FIG. 1, reference numeral 18 denotes a door through which an operator outside of the apparatus may load and unload magnetic tape cartridges to and from the cell units 2 directly by hand.

Figure 2A:
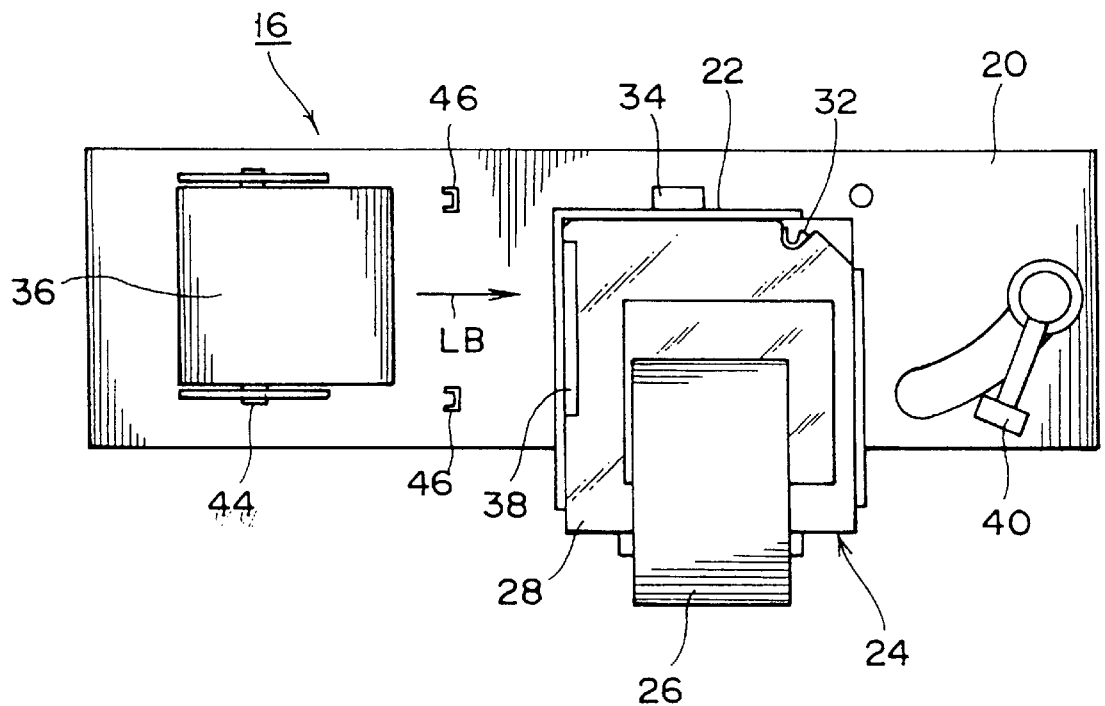
FIGS. 2A and 2B are a plan view and a side view, respectively, of a bar code reader station included in the embodiment.
Figure 2B:
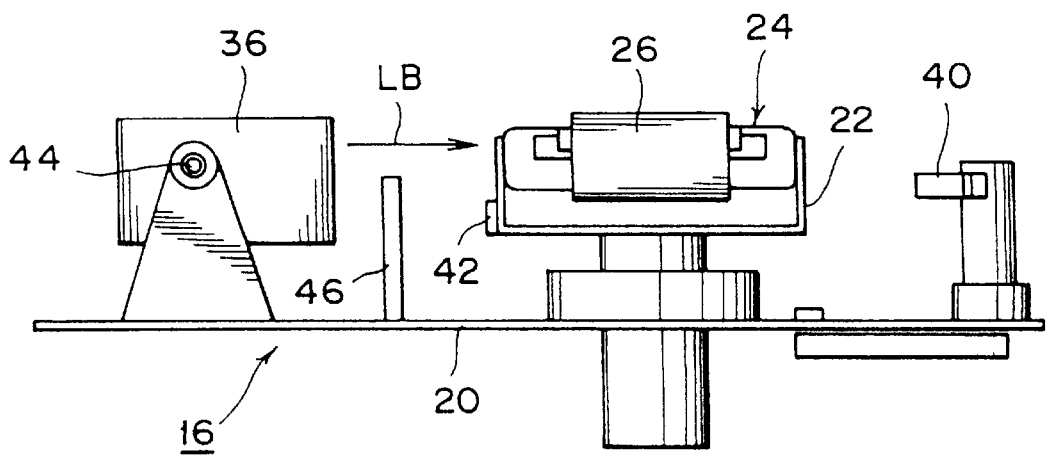

FIGS. 2A and 2B are a plan view and a side view, respectively, of the bar code reader station 16 included in the embodiment. A rotatable table 22 and a bar code reader 36 are furnished on a frame 20. The table 22 has each magnetic tape cartridge 24 received and placed thereon from a hand 26 of the accessor 10 (see FIG. 1). The bar code reader 36 reads a bar code label 38 using a laser beam LB from the magnetic tape cartridge 24 placed on the table 22. Each magnetic tape cartridge 24 is made of a substantially rectangular cartridge case 28, a magnetic tape, not shown, wound and housed inside the cartridge case 28, and a leader block 32 attached to one end of the magnetic tape. The leader block 32 is engaged with one of the four corners of the cartridge case 28 when the magnetic tape is wound up inside the case.

The bar code reader station 16 has the following novel features:

(1) The bar code reader station 16 reads a bar code from a different location of each magnetic tape cartridge 24 by rotating the table 22.

(2) The bar code reader station 16 has means for hammering the leader block 32 of each magnetic tape into the cartridge case 28. In the example shown in FIGS. 2A and 2B, the hammering means comprises an electrically actuated solenoid hammer 40. Conventionally, a loaded magnetic tape cartridge 24 having its leader block disengaged from the cartridge case 28 is still stored into the library apparatus uncorrected. The hammering means keeps a disengaged leader block 32 from staying disengaged from or otherwise misaligned with the cartridge case 28, whereby malfunctions resulting from such leader block irregularities are prevented. The solenoid hammer 40 may be replaced by a block furnished on the edge of the table 22 as will be described later.

(3) A reference bar code label 42 located at a lower position on the side of the table 22 helps to detect a bar code reading failure. When the bar code reader 36 is positioned horizontally as shown in FIG. 2B, the laser beam LB from the bar code reader 36 is irradiated at the side of the magnetic tape cartridge 24. When the irradiation angle of the laser beam LB is varied suitably by rotating the bar code reader 36 around a pivot 44, the bar code reader 36 can read the reference bar code label 42.

(4) A sensor unit 34, furnished on the table 22, checks to see if a magnetic tape cartridge 24 is mounted on a predetermined position of the table 22. Working in this manner, the sensor unit 34 detects the presence of the magnetic tape cartridge 24 from the time the accessor hand 26 grips the cartridge 24 on the table 22 until the hand 26 releases it.

Figure 3A:
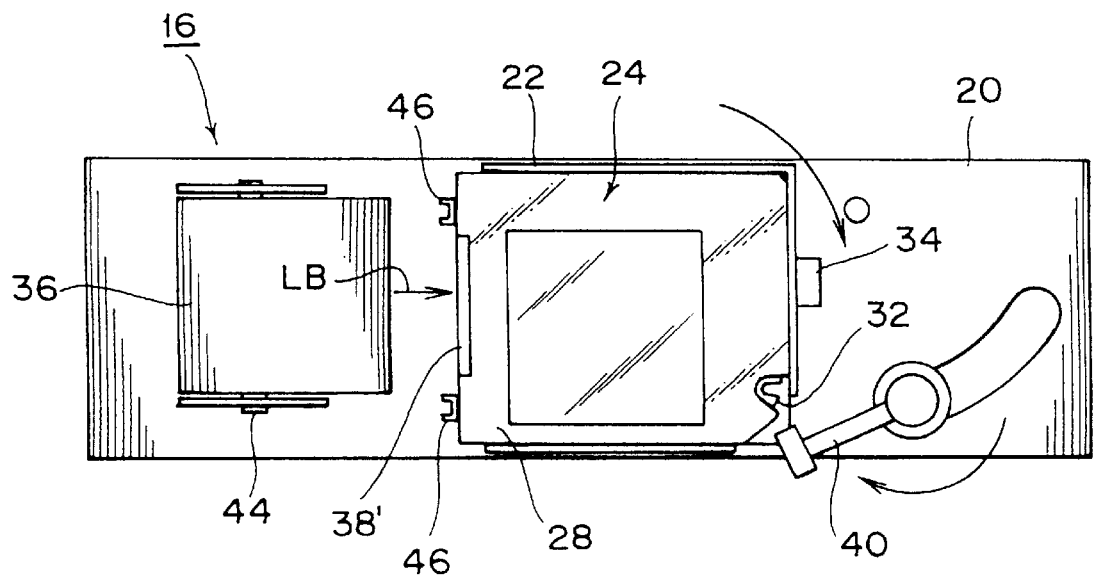
FIGS. 3A and 3B are a plan view and a side view, respectively, of the bar code reader station as its table is being rotated.
Figure 3B:
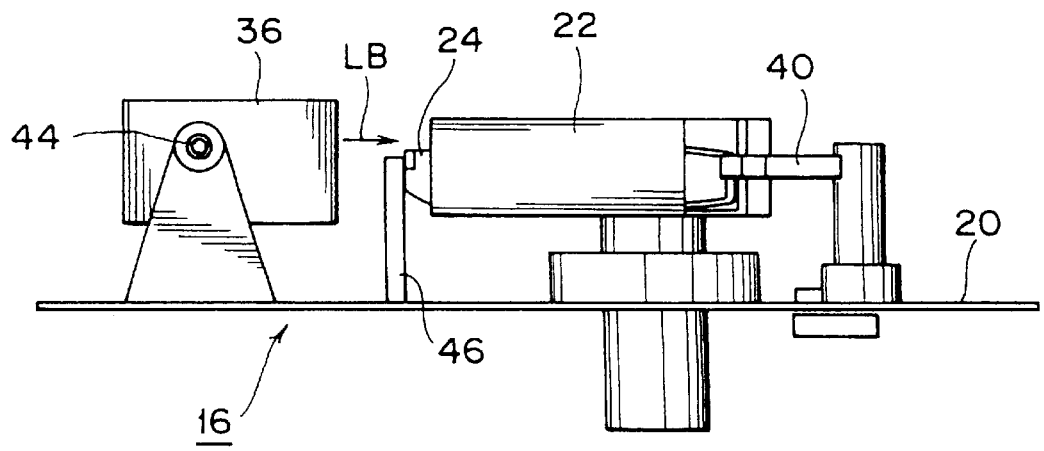

FIGS. 3A and 3B are a plan view and a side view, respectively, of the bar code reader station 16 as its table is being rotated. The table 22 moves on a time series basis as follows: from the state of FIG. 2A, the table 22 first moves upward as shown in parallel translation. After 90-degree rotation, the table 22 moves left in parallel translation, to reach the state of FIG. 3A. At this point, the rear edge of the magnetic tape cartridge 24 comes into contact with a stopper 46 fixed on the frame 20, whereby the displacement of the cartridge 24 is prevented. Such movement of the table 22 is implemented illustratively by the use of the rotary sliding mechanism disclosed in Japanese Patent Laid-open No. H4-184757.

As shown in FIGS. 3A and 3B, rotating the magnetic tape cartridge 24 by 90 degrees on the table 22 allows the bar code reader 36 to read a bar code label 38' easily from the rear edge of the cartridge 24. When the solenoid hammer 40 is actuated in the state depicted in FIGS. 3A and 3B, the leader block 32 is hammered into the cartridge case 28.

As described, the above embodiment enters the state of FIGS. 2A and 2B when the bar code label 38 is to be read from the side edge of the magnetic tape cartridge 24; the embodiment enters the state of FIGS. 3A and 3B when the bar code label 38' is to be read from the rear edge of the cartridge 24.

Figure 4:
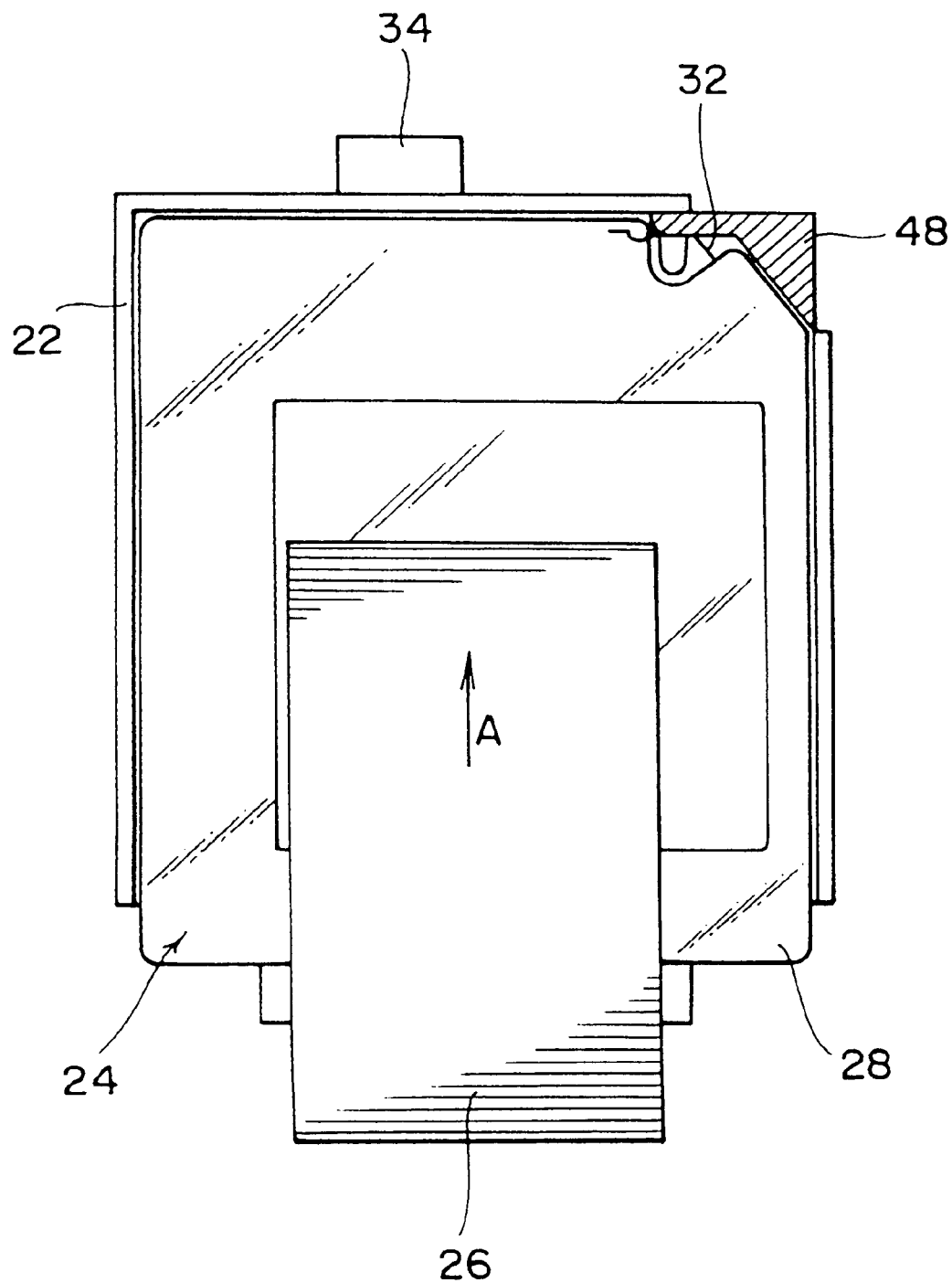
FIG. 4 is a top view of the table.

FIG. 4 shows alternative means for hammering the leader block 32 of the magnetic tape 24 into the cartridge case 28. In this example, the table 22 has a block 48 mounted on its edge whereby a leader block 32 incompletely engaged with the cartridge case 28 is hammered thereinto on the table 22. The block 48 is so shaped as to fit the leader block 32 as it is completely engaged with the cartridge case 28. When the hand 26 of the accessor moves forward (in direction A), the leader block 32 comes into contact with the block 48 which in turn hammers the leader block 32 into the cartridge case 28.

The example above eliminates the need for the leader block hammering mechanism including the solenoid hammer 40. Because the incompletely engaged leader block 32 is hammered into place as the hand 26 moves forward, the time required for the hammering operation is shortened.

Figure 5A:
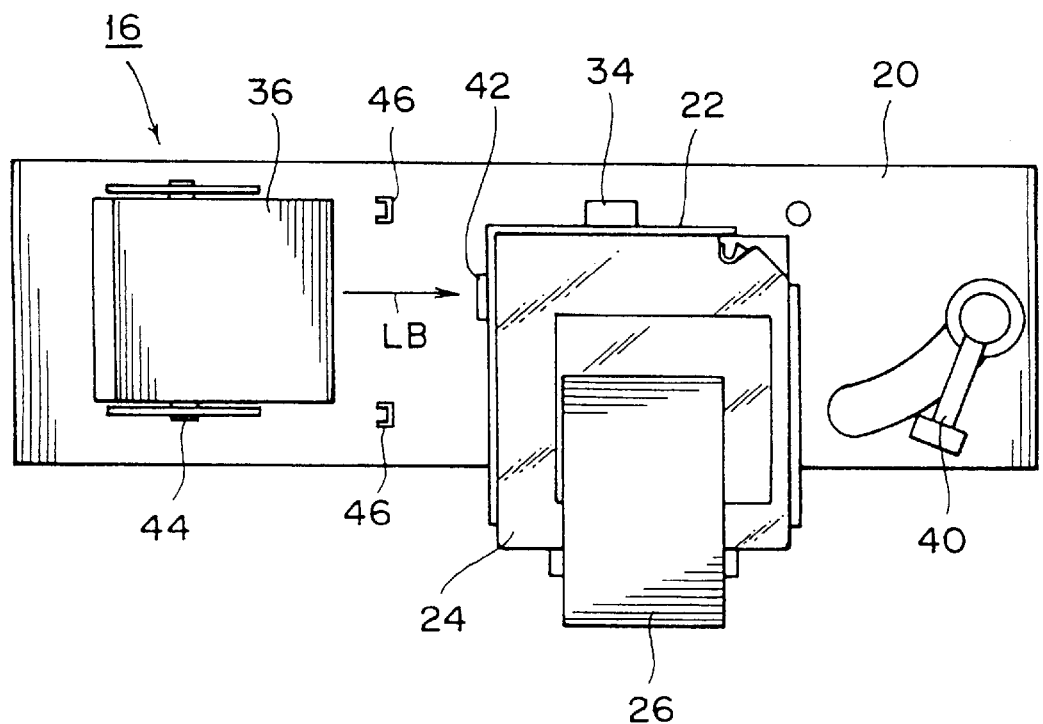
FIGS. 5A and 5B are a plan view and a side view, respectively, of the bar code reader station showing how the station is arranged to read a reference bar code label.
Figure 5B:
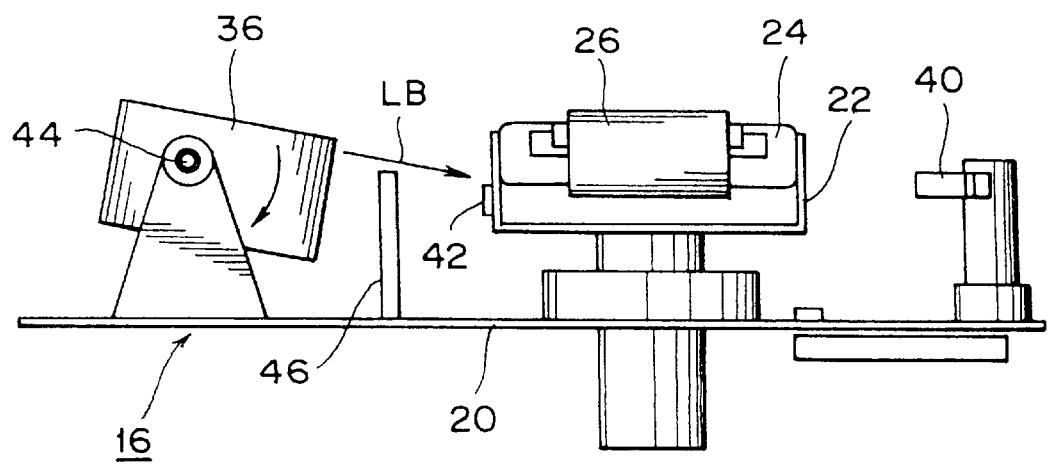

FIGS. 5A and 5B are a plan view and a side view, respectively, of the bar code reader station 16 showing how the station is arranged to read a reference bar code label. It may happen that the bar code reader 36 tries to read the bar code from the rear or side edge of the magnetic tape cartridge 24 but fails to read the bar code label correctly because of a dislodged loading position of the cartridge 24 on the table 22 or because of a soiled label. In such a case, it is not immediately clear whether the failure to read the bar code is attributable to a soiled bar code label or to a mechanical fault of the bar code reader 36.

With this embodiment, the table 22 has the reference bar code label 42 previously attached to its side. Moving in a swinging manner, the bar code reader 36 is arranged to read the reference bar code label 42. If the bar code reader 36 can read the reference bar code label 42, the bar code reader 36 is deemed to be free of mechanical failure; if the bar code reader 36 fails to read the reference bar code label 42, the bar code reader 36 is suspected of a mechanical fault.

Figure 6A:
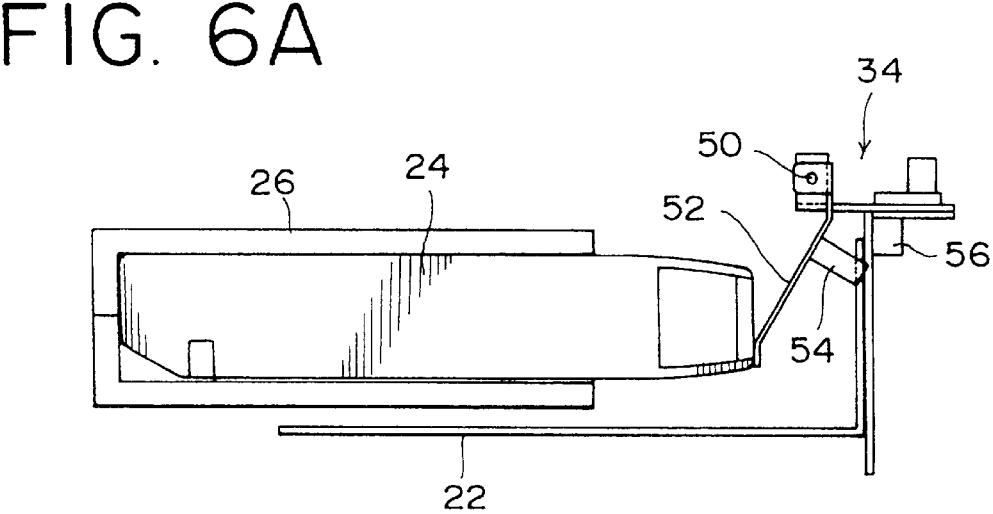
FIGS. 6A, 6B and 6C are views depicting how a sensor unit of the embodiment is constituted and how it works.
Figure 6B:
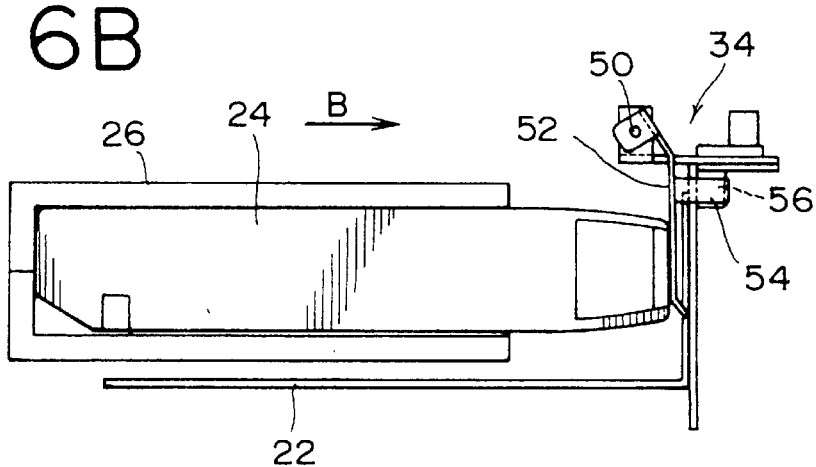
Figure 6C:
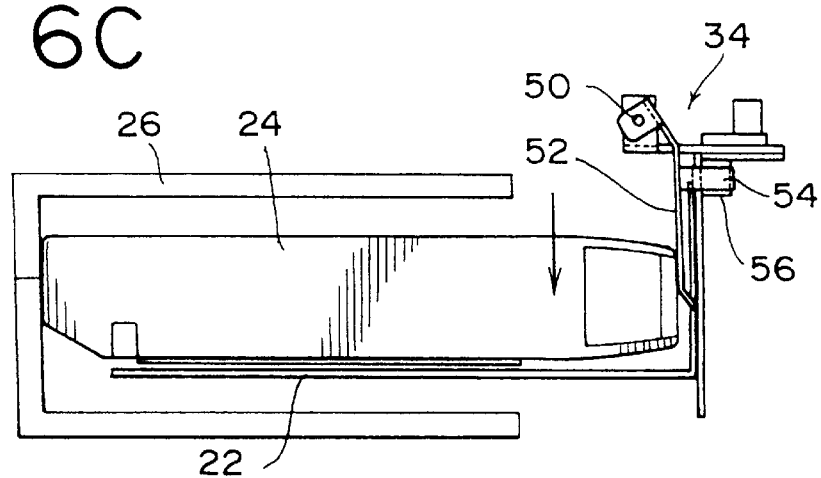

FIGS. 6A, 6B and 6C are views depicting how the sensor 34 unit of the embodiment is constituted and how it works. The sensor unit 34 comprises a fixture 52 attached rotatably to a shaft member 50 whose position is determined with respect to the table 22. The sensor unit 34 also includes a flag 54 attached integrally to the fixture 52, and a sensor 56 for detecting the flag 54. The fixture 52 is kept actuated clockwise in the figures by such actuating means as a spring, not shown. The fixture 52 rotates as the magnetic tape cartridge 24 is moved forward (in direction B) by the accessor hand 26. When the fixture 52 rotates and comes to the opposite position to the sensor 56, the sensor 56 detects the flag 54. This indicates that the magnetic tape cartridge 24 is now positioned where required on the table 22. The sensor 56 may illustratively be an optical sensor.

FIG. 6A shows a state in which the accessor hand 26 grips the magnetic tape cartridge 24 and starts moving forward. FIG. 6B depicts a state in which the hand 26, still gripping the magnetic tape cartridge 24, has ended its forward movement. FIG. 6C indicates a state where the accessor hand 26 has released the magnetic tape cartridge 24 and placed it on the table 22. It can be seen that regardless of the hand 26 gripping or not gripping the magnetic tape cartridge 24, the sensor unit 34 of the embodiment checks to see if the magnetic tape cartridge 24 is positioned where required on the table 22.

Figure 7:
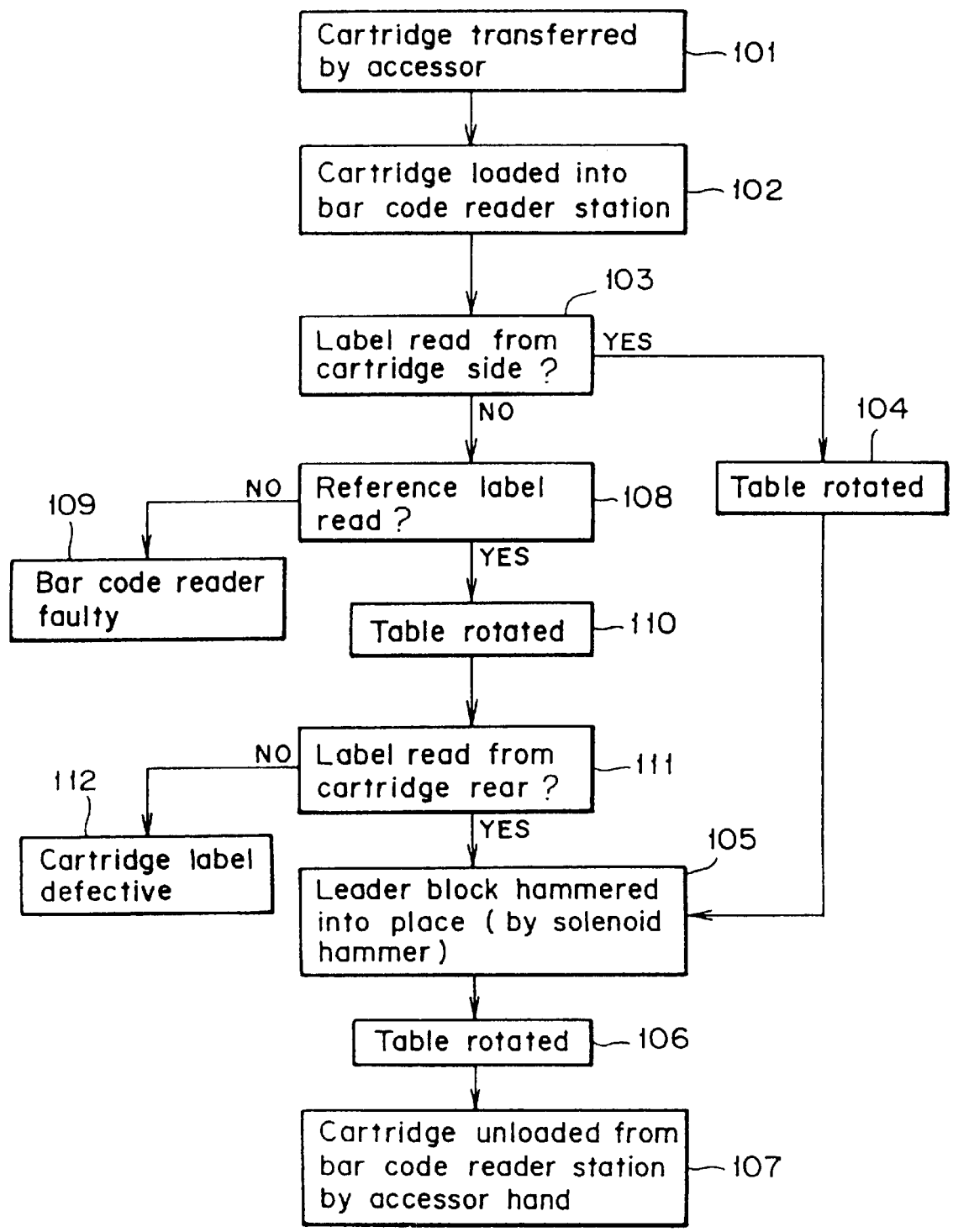
FIG. 7 is a flowchart of steps in which the embodiment uses a solenoid hammer to hammer a leader block of a magnetic tape into place.

FIG. 7 is a flowchart of steps in which the embodiment uses the solenoid hammer to hammer the leader block into place. In step 101, the accessor 10 (see FIG. 1) transfers a magnetic tape cartridge 24. In step 102, the magnetic tape cartridge 24 is placed onto the table 22 of the bar code reader station 16. Then an attempt is made to read the bar code label 38 from the side edge of the magnetic tape cartridge 24 using the bar code reader 36 whose laser beam is irradiated in a substantially horizontal direction (step 103). If the bar code label 38 on the side edge of the magnetic tape cartridge 24 is read correctly in step 103, step 104 is reached. In step 104, the table 22 is rotated by 90 degrees. In step 105, the solenoid hammer 40 hammers the leader block 32 into the cartridge case 28. In step 106, the table 22 is rotated by 90 degrees in the opposite direction. In step 107, the hand 26 of the accessor unloads the magnetic tape cartridge 24 from the bar code reader station 16.

If the bar code label cannot be read in step 103 from the side edge of the magnetic tape cartridge 24, step 108 is reached. In step 108, the irradiation angle of the laser beam from the bar code reader 36 is varied so as to read the reference bar code label 42 from the lower side edge of the table 22. If the reference bar code label 42 cannot be read correctly in step 108, step 109 is reached. In step 109, a suspected failure of the bar code reader 36 is reported to a host computer. If the reference bar code label 42 is read correctly in step 108, step 110 is reached in which the table 22 is rotated by 90 degrees.

In step 111, an attempt is made to read the bar code label 38' from the rear edge of the magnetic tape cartridge 24. If the bar code label 38' on the rear edge of the magnetic tape cartridge 24 cannot be read in step 111, step 112 is reached. In step 112, a suspected defect of the bar code label on the magnetic tape cartridge 24 is reported. If the bar code label 38' is read correctly from the rear edge of the magnetic tape cartridge 24 in step 111, step 105 is reached. In step 105, the leader block 32 is hammered into the cartridge case 28. Step 105 is followed by steps 106 and 107 in that order and in the same manner described.

Figure 8:
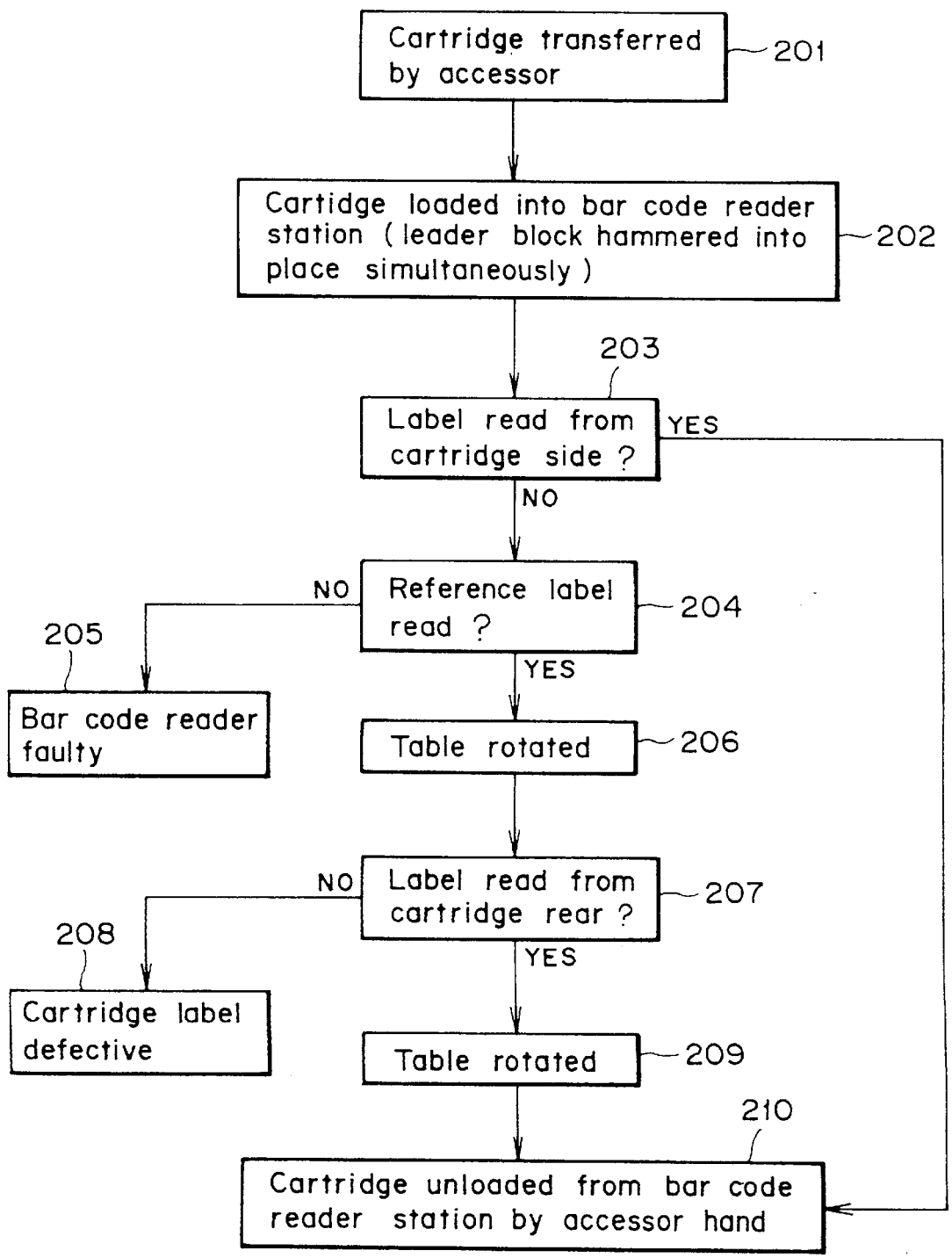
FIG. 8 is a flowchart of steps showing how the embodiment utilizes a block furnished to the table when hammering the leader block into place.

FIG. 8 is a flowchart showing how the advancing force of the accessor hand 26 is utilized to hammer the leader block into place. In step 201, the accessor 10 transfers a magnetic tape cartridge 24. In step 202, the magnetic tape cartridge 24 is loaded into the bar code reader station 16. At this point, the advancing motion of the hand 26 attached to the accessor 10 and the block 48 (see FIG. 4) fixed on the table 22 combine to hammer the leader block 32 into place.

In step 203, an attempt is made to read the bar code label 38 from the side edge of the magnetic tape cartridge 24. If the bar code label 38 is read correctly, step 210 is reached. In step 210, the hand 26 of the accessor 10 unloads the magnetic tape cartridge 24 from the bar code reader station 16. If the bar code label cannot be read in step 203 from the side edge of the magnetic tape cartridge 24, step 204 is reached. In step 204, an attempt is made to read the reference bar code label 42 from the table 22. If the reference bar code label 42 cannot be read in step 204, step 205 is reached. In step 205, a suspected failure of the bar code reader 36 is reported. If the reference bar code label 42 is read correctly in step 204, step 206 is reached in which the table 22 is rotated by 90 degrees.

In step 207, an attempt is made to read the bar code label 38' from the rear edge of the magnetic tape cartridge 24. If the bar code label 38' cannot be read in step 207, step 208 is reached. In step 208, a suspected defect of the bar code label on the magnetic tape cartridge 24 is reported. If the bar code label 38' is read correctly in step 207 from the rear edge of the magnetic tape cartridge 24, step 209 is reached. In step 209, the table 22 is rotated by 90 degrees in the opposite direction. Step 209 is followed by step 210 in which the hand 26 of the accessor 10 unloads the magnetic tape cartridge 24 from the bar code reader station 16.

Figure 9:
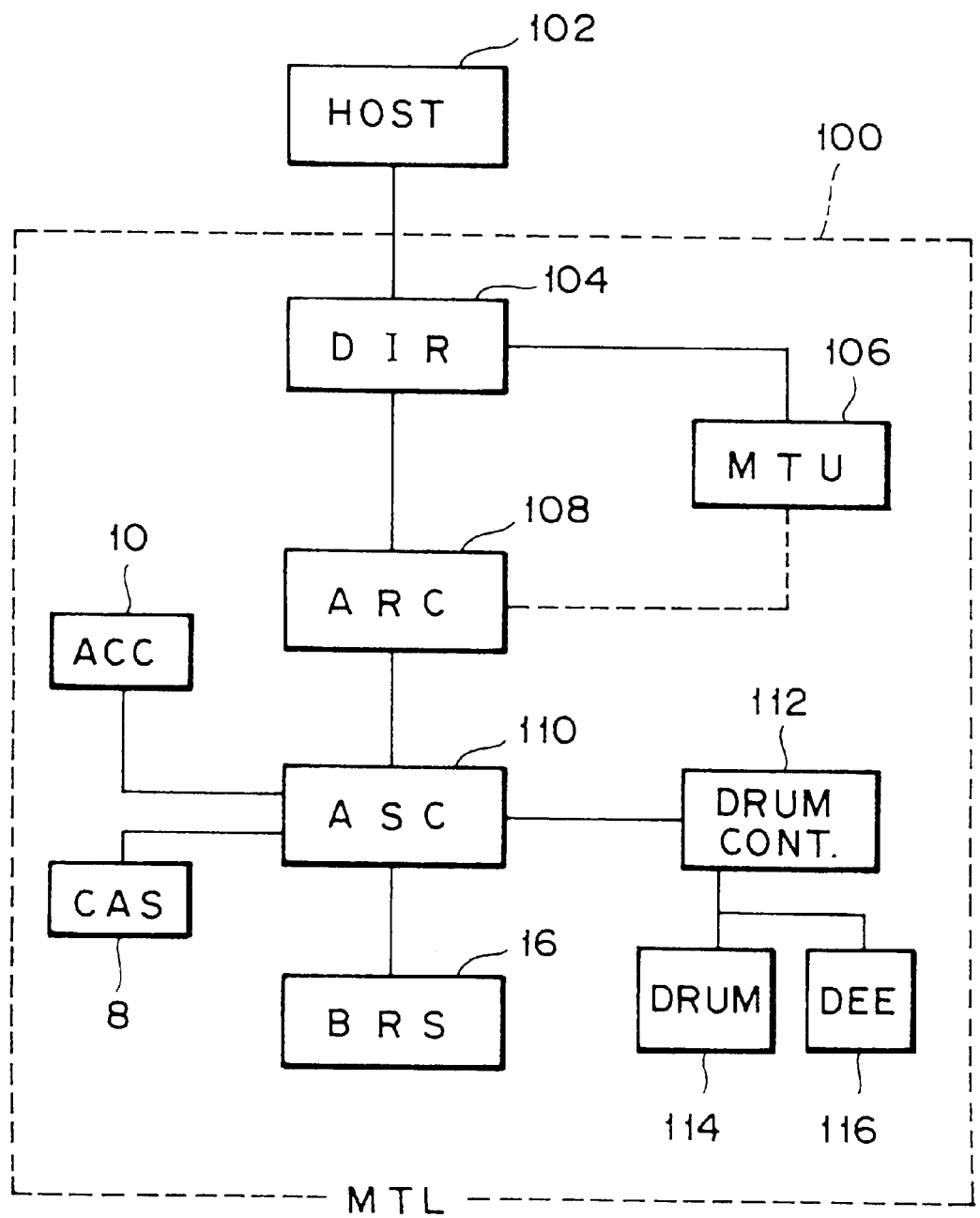
FIG. 9 is a block diagram of the magnetic tape library apparatus embodying the invention.

FIG. 9 is a block diagram of the hardware making up the magnetic tape library apparatus which embodies the invention. The magnetic tape library apparatus 100 has a director (DIR) 104 connected to a host computer 102. The DIR 104 is connected with a magnetic tape unit (MTU) 106 corresponding to the drive unit 4 of FIG. 1, and with an accessor controller (ARC) 108 for controlling the accessor 10.

The ARC 108 is connected to an accessor servo controller (ASC) 110 for accessor robot control. In turn, the ASC 110 is connected to the accessor (ACC) 10, the cartridge access station (CAS) 8, the bar code reader station (BRS) 16 and a drum controller 112. The drum controller 112 controls drums 114 of the cell units 2 in FIG. 1 and a direct entry-exit unit (DEE) 116 corresponding to the door 18 in FIG. 1. The DEE 116 is used to load or unload large quantities of cartridges to or from the cell units 2 directly and simultaneously.

Figure 10:
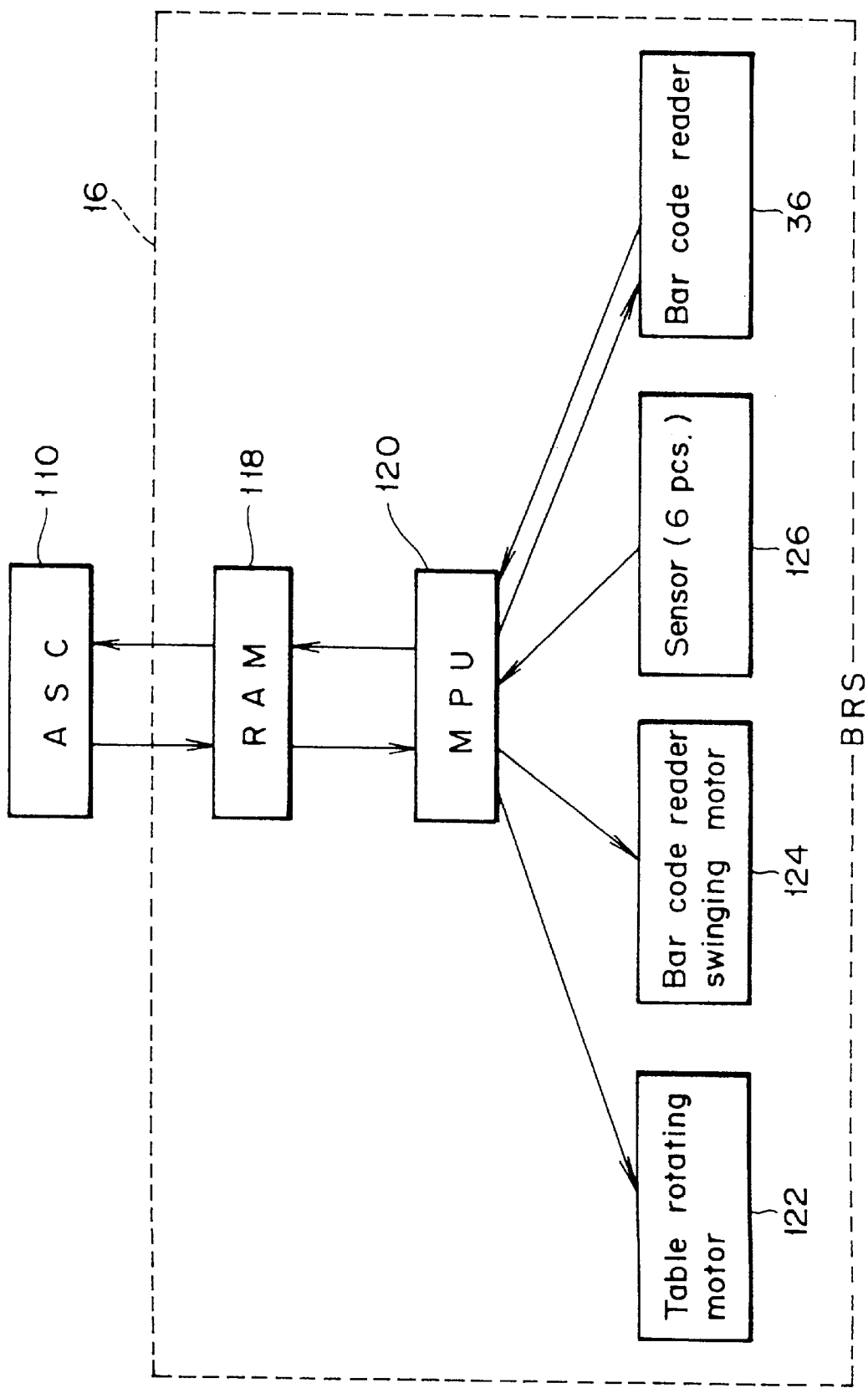
FIG. 10 is a block diagram of the bar code reader station in the embodiment.

FIG. 10 is a block diagram of the hardware making up the bar code reader station 16 contained in the embodiment. The bar code reader station 16 includes a random access memory (RAM) 118 for temporarily accommodating data and a multiprocessor unit (MPU) 120 for performing operations according to program. These units are connected to the ASC 110 through a data bus and via an I/O port, not shown. The bar code reader station 16 further comprises a motor 122 for rotating the table 22, a motor 124 for swinging the bar code reader 36, various sensors (a total of 6 in this example) 126, and the bar code reader 36. These components are connected to the MPU 120.

When the aforementioned steps are carried out on the hardware arrangements outlined in FIGS. 9 and 10, the bar code label is read easily from each magnetic tape cartridge regardless of where the label is pasted on the cartridge.

Although the description above contains many specificities, these should not be construed as limiting the scope of the invention but as merely providing illustrations of the presently preferred embodiments of this invention. For example, the invention, which is applied above to a large-scale magnetic tape library apparatus comprising a plurality of cell units and a plurality of bar code reader stations, may also be applied to a smallscale magnetic tape library apparatus having one cell unit and one bar code reader station.

Thus the scope of the invention should be determined by the appended claims and their legal equivalents, rather than by the examples given.

What is claimed is:

1. A magnetic tape library apparatus for use with substantially rectangular magnetic tape cartridges each with a magnetic tape wound and housed therein, said magnetic tape having a leader block attached to one end thereof and engaged with one of the four corners of each cartridge case, said magnetic tape library apparatus comprising:

a cell unit having a plurality of cells of accommodating the magnetic tape cartridges;

a drive unit for performing write and read operations on any one of said magnetic tape cartridges;

a cartridge access station for loading and unloading said magnetic tape cartridges; and an accessor moved along a predetermined movement path for transferring said magnetic tape cartridges between said cell unit, said drive unit, said cartridge access station and a bar code reader station;

said bar code reader station being located along the movement path of said accessory, said bar code reader station including a bar code reader for reading bar codes on the magnetic tape cartridges and a rotatable table adjacent to said bar code reader for carrying any one of the magnetic tape cartridges thereon and for rotating a magnetic tape cartridge placed thereon with respect to said bar code reader, said bar code reader reading a bar code from the magnetic tape cartridge placed, by said accessor, on said rotatable table.

2. A magnetic tape library apparatus according to claim 1, further comprising hammering means for hammering said leader block into the cartridge case placed on said rotatable table if said leader block is incompletely engaged with said cartridge case.

3. A magnetic tape library apparatus according to claim 2, wherein said hammering means includes a solenoid hammer furnished to said bar code reader station.

4. A magnetic tape library apparatus according to claim 2, wherein said hammering means includes a block provided on the edge of said rotatable table, said block being so shaped as to fit said leader block as said leader block is engaged completely with the cartridge case on said rotatable table.

5. A magnetic tape library apparatus according to claim 1, wherein one side of said rotatable table has a reference bar code label attached thereto, and wherein said bar code reader station includes means for changing the irradiation angle of a laser beam from said bar code reader so that said bar code reader may read said reference bar code label.

6. A magnetic tape library apparatus according to claim 1, wherein said bar code reader station further includes a sensor unit for detecting whether the magnetic tape cartridge is placed where previously designated on said rotatable table.

7. A magnetic tape library apparatus according to claim 1, wherein said rotatable table rotates the magnetic tape cartridge on said rotatable table when said bar code reader is unable to read said bar code so that another side of the magnetic tape cartridge faces said bar code reader.

8. A library apparatus for use with cartridges comprising:

a cell unit having a plurality of cells of accommodating the cartridges;

a drive unit for performing write and read operations on any one of said cartridges;

a cartridge access station for loading and unloading said cartridges; and an accessor moved along a predetermined movement path for transferring said cartridges between said cell unit, said drive unit, said cartridge access station and a bar code reader station;

said bar code reader station being located along the movement path of said accessor, said bar code reader station including a bar code reader for reading bar codes on the cartridges and a rotatable table adjacent to said bar code reader for carrying any one of the cartridges thereon and for rotating a cartridge placed thereon with respect to said bar code reader, said bar code reader reading a bar code from the cartridge placed, by said accessor, on said rotatable table.

9. A library apparatus for use with cartridges comprising:

a cell unit having a plurality of cells of accommodating the cartridges;

a drive unit for performing write and read, operations on any one of said cartridges;

a cartridge access station for loading and unloading said cartridges; and an accessor moved along a predetermined movement path for transferring said cartridges between said cell unit, said drive unit, and said cartridge access station;

a bar code reader for reading bar codes on the cartridges; and a rotatable table for rotating a cartridge placed thereon with respect to said bar code reader, said bar code reader reading a bar code from the cartridge placed, by said accessor, on said rotatable table.

\* \* \* \* \*

UNITED STATES PATENT AND TRADEMARK OFFICE
CERTIFICATE OF CORRECTION

PATENT NO. : 6,064,543
DATED : May 16, 2000
INVENTOR(S) : Ichiro Tatsuta

It is certified that error appears in the above-identified patent and that said Letters Patent is hereby corrected as shown below:

Column 7,
Line 11, delete the second occurrence of "of" and insert -- for --
Line 22, delete "accessory" and insert -- accessor --

Column 8,
Line 14, delete the second occurrence of "of" and insert -- for --
Line 35, delete the second occurrence of "of" and insert -- for --

Signed and Sealed this

Sixteenth Day of October, 2001

Attest:

NICHOLAS P. GODICI
Attesting Officer  Acting Director of the United States Patent and Trademark Office